United States Patent [19]

Seims et al.

[11] 3,928,902
[45] Dec. 30, 1975

[54] TOOL FOR TUBELESS TIRE VALVES

[75] Inventors: Warren J. Seims, Freeport; Gabor Farkas, Stony Point, both of N.Y.

[73] Assignee: Acme Air Appliance Co., Inc., Hackensack, N.J.

[22] Filed: Dec. 4, 1974

[21] Appl. No.: 529,455

[52] U.S. Cl. .............................. 29/221.5; 29/267
[51] Int. Cl.² ........................................ B25P 19/04
[58] Field of Search ................ 29/267, 221.5, 221; 254/29 R, 132, 131; 81/15.2

[56] References Cited
UNITED STATES PATENTS

| | | | |
|---|---|---|---|
| 2,681,791 | 6/1954 | Hahn | 29/267 X |
| 3,088,199 | 5/1963 | Lewis | 29/221.5 |
| 3,769,683 | 11/1973 | Krekder | 29/267 |

Primary Examiner—James L. Jones, Jr.
Attorney, Agent, or Firm—Albert C. Johnston

[57] ABSTRACT

A tool for quickly installing tubeless tire valves in or removing them from rim holes comprises a levering bar one end portion of which provides a handle and the other a fulcrum to be seated against a portion of a tire rim, with a valve gripping foot depending from a mid-portion of the bar. The gripping foot contains an aperture which, at a certain inclination of the bar, will slip freely over the threaded end of a valve stem, and which is bordered by ridges so that, upon the foot then being tilted with the bar, the ridges will grip the stem end at locations between its external threads. Further tilting movement of the bar with its fulcrum end appropriately seated against the rim lifts the gripping foot with the valve stem held in it, thus forcing the valve head into sealed position in the rim hole or pulling it entirely out of the hole when so desired.

7 Claims, 8 Drawing Figures

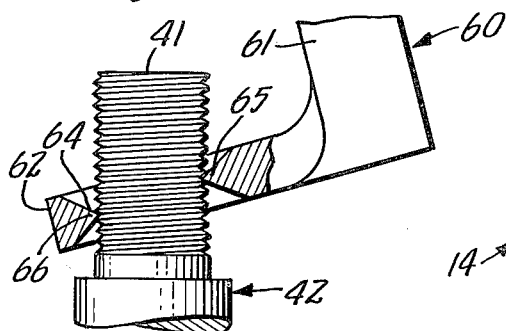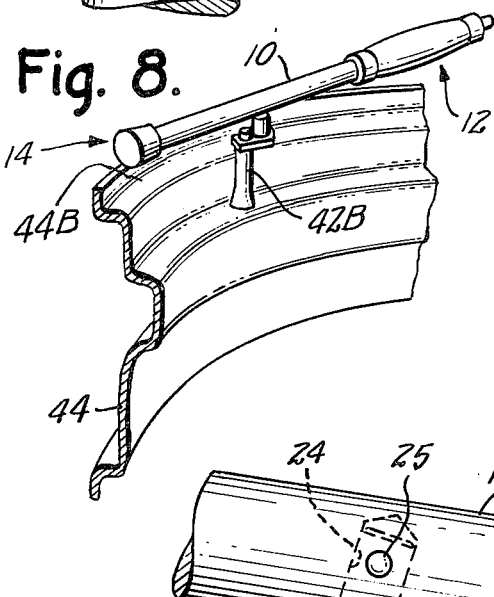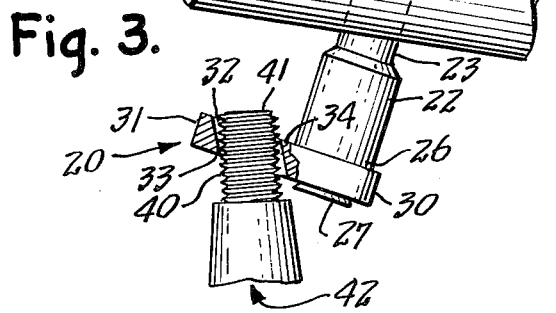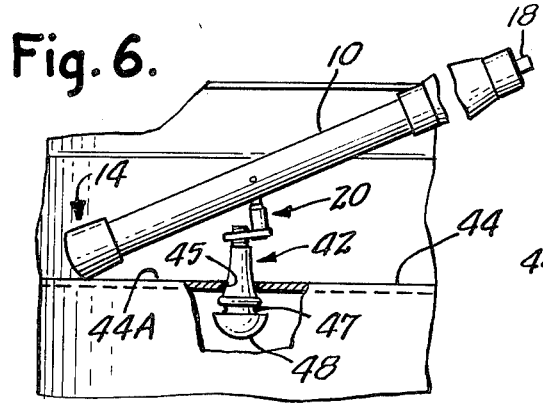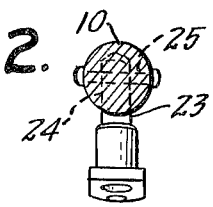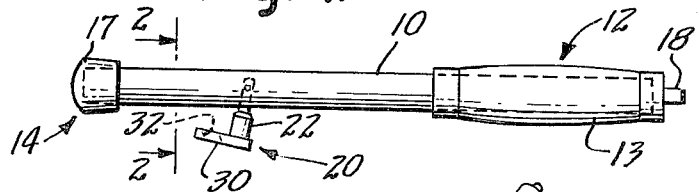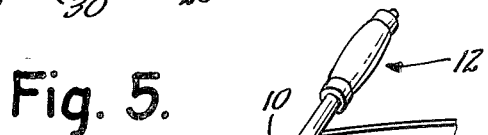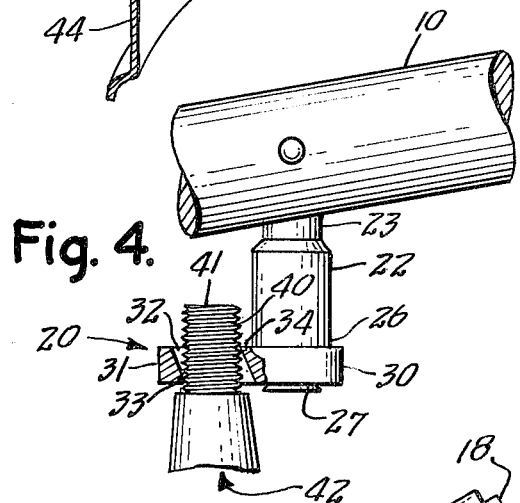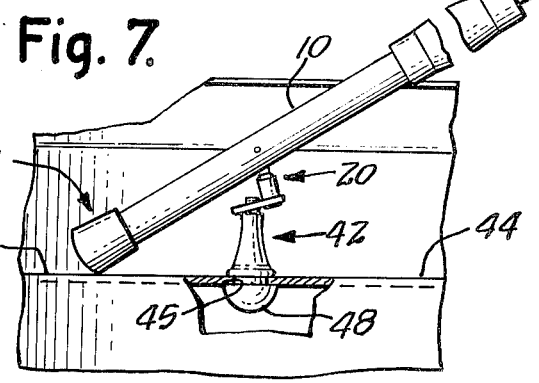

3,928,902

TOOL FOR TUBELESS TIRE VALVES

This invention relates to a tool for quickly installing valves for tubeless pneumatic tires in wheel rims, and for removing such valves from the rims.

Tubeless tires fit into shouldered rims in each of which an air valve is installed and sealed by being pulled or thrust into a hole in the rim. The valve typically has a bulbous head of rubber or other elastomeric material that is squeezed into the rim hole, with a stem protruding from the rim to contain a valve core and present a threaded end portion having a cap screwed thereon.

Several forms of manually operable tools are known for installing and removing such valves. Some of the known tools are shown in U.S. Pat. Nos. 2,940,167, 2,947,073 and 3,562,891. The tools generally used comprise a bar or lever member providing a handle portion and a fulcrum device to bear against the rim, and having on its end a device to engage the valve either by being screwed onto its stem end or by gripping the stem body between relatively movable jaw elements. The tools to be screwed onto the stem end are time consuming to use; those which employ stem gripping jaw elements are limited in serviceability, and they sometimes damage the rubber of the stem body.

The principal object of the present invention is to provide a tool by which the installation of tubeless tire valves and their removal when desired can be effected more quickly and easily than with the tools known for this purpose, and which will not damage the stem body of the valve.

A tool fulfilling this objective according to the invention comprises a levering member, or bar, having a handle portion at one end thereof and having at a location away from the handle portion a fulcrum portion adapted to be seated against a portion of the wheel rim, and a valve gripping foot depends from the bar at a location spaced from both the handle portion and the fulcrum portion and contains an aperture bordered by oppositely directed ridges which are spaced apart in the axial direction of the aperture so that, at a certain inclination of the foot, the ridges will slip freely over the threaded end of the valve stem and then, simply by being tilted with the bar and the foot relative to the valve stem, will grip the stem end securely at locations between the external screw threads thereon. The fulcrum portion then may be seated against the rim at an appropriate location, depending upon the length of the valve stem, whereupon a further tilting movement of the bar about the fulcrum so provided lifts the gripping foot with the stem end gripped in it and forces the elastic head of the valve into sealed position in the rim hole. Similarly, the valve head can be pulled entirely out of the rim hole if it is desired to remove an old or defective valve from a rim, with tire mounted or unmounted.

In a particularly advantageous embodiment of the invention the levering member is a substantially straight rigid bar, preferably made of solid aluminum or magnesium, that presents the handle portion and the fulcrum portion at its opposite ends, and the gripping foot comprises an apertured foot plate projecting laterally from an ankle post that is fixed to the bar at a location spaced away from the bar end that constitutes the fulcrum portion. This fulcruming bar end is made blunt and preferably is covered by a protective sock, or bumper, made of a relatively soft, tough frictional material, such as a rubber or a synthetic elastomer, that will resist slipping thereof away from its seated location on the rim under pressure, and prevent damage to chrome or magnesium wheels.

The aperture in the foot plate may be a substantially cylindrical bore extending obliquely through the plate and having a diameter slightly greater than that of the external threads on the end of the valve stem. Thus, an upper edge portion and an opposite lower edge portion of the wall of this bore constitute axially spaced, oppositely directed ridges bordering the aperture. When the foot plate so apertured is suitably tilted with the bar in one direction, the aperture will align with and slip quickly over the threaded end of a valve stem. When the foot plate is then tilted with the bar in the opposite direction, the ridges engage and grip the stem end at locations between its external screw heads. The ankle post of the foot plate then lies on an axis nearly parallel to the axis of the valve stem, so that the stem may be pulled nearly straight through the rim hole by ensuing upward movement of the bar about its fulcruming end positioned against the rim.

The above mentioned and other objects, features and advantages of the invention will be further apparent from the following detailed description and the accompanying drawings of illustrative embodiments of the invention. In the drawings:

FIG. 1 is a side elevational view of a preferred form of the tire valve tool provided according to the invention;

FIG. 2 is a view thereof, partly in vertical cross section, taken at line 2—2 of FIG. 1;

FIG. 3 shows a disposition of the bar and the gripping foot suitable for slipping the foot plate over the threaded end of the valve stem;

FIG. 4 shows a disposition of the same for gripping the stem end;

FIG. 5 is a perspective view of the tool engaged with a relatively short tubeless tire valve and positioned for pulling the valve head into the rim hole;

FIG. 6 is a side elevational view thereof, partly in section;

FIG. 7 is a side elevational view, similar to that of FIG. 6, showing the tool and valve positions when the valve is installed;

FIG. 8 is a perspective view of the tool engaged with a relatively long tubeless tire valve and positioned for pulling the valve head into the rim hole; and FIG. 9 is a side elevational view, partly in section, of an alternative form of the gripping foot in lifting engagement with the threaded end of a valve stem.

As may be seen in FIGS. 1–8 of the drawings, a preferred embodiment of the tool here provided for installing and removing tubeless tire valves comprises a substantially straight rigid bar 10, which typically is a length of a cylindrical bar or rod of solid aluminum, and a valve gripping foot 20 that is fixed to the bar 10 and depends from it at a location between a handle portion 12 provided near one end of the bar and a fulcrum portion 14 provided by the other end of the bar.

The handle portion 12 preferably has a hand grip 13 fixed thereon. The fulcruming end 14 of the bar preferably is made blunt and covered by a sock 17 of relatively soft, tough frictional material. The grip 13 and the sock 17 may each be, for example, a molding of a tough rubber or synthetic elastomer that strongly resists wear and abrasion. The bar 10 may also be provided, if desired, with an integral pin 18 protruding from the end of its handle portion 12 so that this pin may be used in known manner, when occasion arises, for pushing a tubeless tire valve out of a rim hole.

The gripping foot 20 comprises an ankle post 22 lying oblique to the bar 10 and a foot plate 30 projecting laterally from the ankle post. The post 22 has a mounting portion 23 which is fitted into a bore 24 formed obliquely in the bar 10 and is fixed in the bore by an anchor pin 25. The foot plate 30 is fixed to the lower end portion 26 of the ankle post, as by a rivet or screw 27. Its projecting portion 31 protrudes laterally from the ankle post over a distance, e.g. of approximately ⅝ inch (16 mm.), considerably greater than the standard outside diameter of the threaded stem end of a tubeless tire valve.

As shown in FIG. 1 and more fully in FIGS. 3 and 4, the projecting foot plate portion 31 contains an aperture 32 which, in this embodiment, has the form of a cylindrical bore extending obliquely through the plate on an axis sloped toward a portion of the bar 10 between the gripping foot 20 and the fulcrum portion 14. The diameter of the aperture or bore 32 is slightly greater than that of the external screw threads 40 on the threaded end 41 of the stem 42 of a tubeless tire valve. When such a valve is being installed, its stem 42 has been extended at least partly through the valve hole 45 of a tire rim 44, as indicated in FIGS. 5 and 6. As indicated in FIG. 3, the aperture 32 of the gripping foot 30 can be slipped quickly over the stem end of the valve simply by holding bar 10 and gripping foot 20 at an inclination such that the aperture lies nearly in coaxial alignment with the valve stem.

By virtue of the oblique extension of the bore 32 through the foot plate 30, the wall of the bore presents an acutely angled edge or ridge 33 at the lower side of the plate and, as viewed in the direction of the length of bar 10, an oppositely directed acutely angled edge or ridge 34 at the upper side of the plate. The peaks of these ridges are spaced apart in the direction transverse to the plate by a distance that is a whole number multiple of the pitch of the screw threads, e.g., three or four times the thread pitch.

Accordingly, when the apertured portion of the foot plate has been slipped over the valve stem end to the position indicated in FIG. 3, an upward tilting movement of the bar 10 and gripping foot 20 relative to the valve stem will bring the parts to the gripping position indicated in FIG. 4, thus converging the ridges 33 and 34 against opposite sides of the stem end 41 so that the ridges tightly grip the stem end by engaging in valleys between the screw threads.

With the tool so engaged, its handle portion 12 may be lifted further to seat the fulcrum end 14 on a nearby portion of a shoulder of the rim 44. A continuing lifting movement of the handle then works about the fulcrum provided by the seated bar end 14 so as to lift and squeeze the valve stem 42 forcibly through the rim hole 45 until the margin of the hole 45 is engaged and sealed in the groove 47 at the base of the bulbous head 48 of the valve.

FIGS. 5, 6 and 7 illustrate typical relative positions of the tool, the valve and the rim in the course of installing a tubeless tire valve having a relatively short stem 42. In such a case, the fulcrum end 14 of the tool may be seated on a portion of an inner shoulder 44A of the rim. When the valve to be installed has a long stem, as illustrated at 42B in FIG. 8, the fulcrum end 14 of the tool may be seated on a portion of an outer shoulder 44B of the rim. It will be noted that, in any case, the ankle post 22 lies on an axis approximately parallel to the axis of the valve stem, so that the tool exerts its force approximately axially of the valve and the rim hole during the tilting and lifting movement of the bar 10 that serves to pull the valve through the rim hole.

A forcible lifting movement of the tool beyond the position thereof indicated in FIG. 7 may be used to remove a valve entirely from the rim hole.

The valve gripping foot may be made in forms differing from that of the preferred embodiment. An alternative form 60, as illustrated in FIG. 9, comprises a unitary forging of strong metal, such as steel, having an ankle portion 61 fixed to the bar 10 of the tool and having a foot portion 62 containing a ridged aperture 64. The acutely angled ridges 65 and 66 of this aperture constitute its bounding surface, being formed internally between the opposite sides of the foot portion 62.

We claim:

1. A tool for installing a valve for a tubeless tire in or removing it from the valve hole of a tire rim, said valve having a stem extending at least partly through said hole and formed with an externally threaded end, comprising a bar presenting a handle portion at one end thereof and having at a location away from said one end a fulcrum portion adapted to be seated against a portion of said rim, and a valve gripping foot depending from said bar at a location spaced away from both said handle portion and said fulcrum portion, said foot comprising an ankle post fixed to said bar and a foot plate projecting laterally from said post, said foot plate containing an aperture extending therethrough and of sufficient diameter to be passed over said stem end, said aperture being bordered at its opposite sides as viewed lengthwise of said bar by oppositely directed ridges which are spaced apart in the axial direction of the aperture and which are engageable between threads on said stem end so as to grip said stem end and lift it for displacement of said valve by a tilting movement of said bar and said gripping foot about a seated location of said fulcrum portion on said rim.

2. A tool according to claim 1, said bar being a substantially straight rigid metal bar presenting said handle portion near one end thereof and presenting said fulcrum portion at its other end.

3. A tool according to claim 2, said fulcrum portion being a blunt end of said metal bar having thereon a covering of relatively soft, tough material that resists slipping thereof away from said seated location under pressure.

4. A tool according to claim 3, said covering material being a rubber or a synthetic elastomer.

5. A tool according to claim 1, said aperture being a substantially cylindrical bore extending obliquely through said foot plate and having a diameter slightly greater than that of the external threads on said stem end, said ridges being constituted by an upper edge portion and an opposite lower edge portion of the wall of said bore.

6. A tool according to claim 5, said ankle post extending obliquely from said bar at an angle such that its axis lies approximately parallel to the axis of said valve stem when said bar and said gripping foot are titlted at an inclination for gripping engagement of said ridges with said stem end.

7. A tool for installing valves for tubeless tires, comprising a substantially straight rigid metal bar having a handle grip on one end portion thereof and having on the other end thereof a covering sock of relatively soft, tough material that resists slipping under pressure, and a valve gripping foot depending from said bar at a location intermediate said sock and said grip, said gripping foot comprising an ankle post fixed to and extending obliquely from said bar and a foot plate projecting laterally from the end of said post, said foot plate having a substantially cylindrical bore extending obliquely therethrough, the diameter of said bore being slightly greater than that of the external threads on the end of a tubeless tire valve stem, the edges of said bore at the opposite sides of said plate presently oppositely directed ridges which are engageable between said threads by a tilting movement of said bar so as to grip the valve stem end between said ridges.

* * * * *